United States Patent [19]

Benoist et al.

[11] 3,979,692

[45] Sept. 7, 1976

[54] APPARATUS FOR PHASE KEYING IN FREQUENCY AND PHASE VOLTAGE CONTROLLED OSCILLATOR WITH AN INCOMING SIGNAL HAVING A T PERIOD, AND PHASE CODED OF THE BIPHASE PCM TYPE OR PSK TYPE

[75] Inventors: Jean-Charles Benoist, Le Chesnay; François Bitsch, Fourqueux; Gérard René Joseph Tarel, Ramonville-Saintagne, all of France

[73] Assignee: Electronique Marcel Dassault, Paris, France

[22] Filed: Aug. 4, 1975

[21] Appl. No.: 601,446

[30] Foreign Application Priority Data

Aug. 6, 1974  France .............................. 74.27339

[52] U.S. Cl. .............................. 331/1 A; 325/320; 325/419; 329/122; 331/11
[51] Int. Cl.² .......................................... H03B 3/04
[58] Field of Search ................... 329/122, 124, 125; 331/1, 11; 325/320, 419

[56] References Cited

UNITED STATES PATENTS 3,806,815  4/1974  Fletcher ............................. 329/122

*Primary Examiner*—John Kominski
*Attorney, Agent, or Firm*—Karl F. Ross; Herbert Dubno

[57] ABSTRACT

Apparatus for phase keying in frequency and phase voltage controlled oscillator with an incoming signal having a T period phase coded of the biphase PCM or PSK type.

The apparatus comprises a circuit loop for phase controlling the oscillator with logic circuitry and first and second conductive paths. Each of the first and second conductive paths have integrators. The integration time of the first and second integrators is equal to the period T of the incoming signal. The limits of integration of the first integrator are − T/8 and + 7T/8 and the limits of integration of the second integrator are + T/8 and + 9T/8. A delay element is disposed between the logic circuitry and the second conductive path introducing retardation time of T/4.

5 Claims, 11 Drawing Figures

APPARATUS FOR PHASE KEYING IN FREQUENCY AND PHASE VOLTAGE CONTROLLED OSCILLATOR WITH AN INCOMING SIGNAL HAVING A T PERIOD, AND PHASE CODED OF THE BIPHASE PCM TYPE OR PSK TYPE

The present invention relates to an apparatus for recognition of digital information composing a phase modulated binary message.

It has been proposed to transmit information by having a $+\pi$ or $-\pi$ phase shift correspond to digital values, the direction of transition of the phase thereby characterizing the digital value to be transmitted.

Upon reception, and after demodulation, there is present an incoming signal, usually accompanied with noise, which may be represented, when disregarding the noise, by upper and lower voltage levels, the transitions between the levels which follow regularly the coding period, corresponding to one or the other of the digital values of a binary digital system depending on whether they are rising or falling.

The invention provides, for obtaining information free of noise, producing by means of a local oscillator signals having the same frequency as the incoming signals, and by comparison therewith, effecting the recognition of the direction of the phase transition, thereby furnishing digital information in the usual form of one of two voltages of different values.

For recognition, the local oscillator must be controlled not only in frequency but also in phase with respect to the incoming signals. A conventional phase loop is incapable to obtain or maintain the phase keying of the local oscillator, as the succession of transitions is unknown because it corresponds to unpredictable transmitted information.

The invention provides a system for the recognition of digital information transmitted in binary signals comprising for phase keying a voltage controlled local oscillator, a loop with two parallel conductive paths at the inputs of which are applied incoming signals and signals from the local oscillator, each of the conductive paths including an integrator operative during one period of the incoming signals, the integrators of the two conductive paths differing from each other by the time limits of integration with respect to the incoming signals, the difference between the integrated voltages being the control factor of the local oscillator.

The apparatus according to the invention is characterized in that the limits of integration of the integrators of the two paths are for one path $-T/8$ and $+7T/8$ and for the other path $+T/8$ and $+9T/8$, the limits of integration being attributed to the incoming signal after acquisition of the periodic rhythm, delay means introducing a delay of $T/4$ into the signals provided by the local oscillator and applied to the second conductive path.

By this choice of the values of the limits of integration and the value of the delay, the apparatus ensures the phase keying of the local oscillator regardless of succession of the binary values of the incoming signals. The apparatus is therefore always capable of transforming a message of phase modulated digital signals, eventually with noise, into digital information which are distinct by their voltage values and are free of noise as provided from the local oscillator.

The pick-up range of the apparatus remains good, i.e. the local oscillator is frequency and phase keyed sufficiently rapidly upon reception of the "preamble" of a transmitted message, viz., a succession of predetermined signals, and the phase keying of the local oscillator continues to be assured during the transmission of the message proper, even if the message comprises a long series of signals representing the same value.

The following description, given by way of example, refers to the accompanying drawings, in which.

Figure 1:
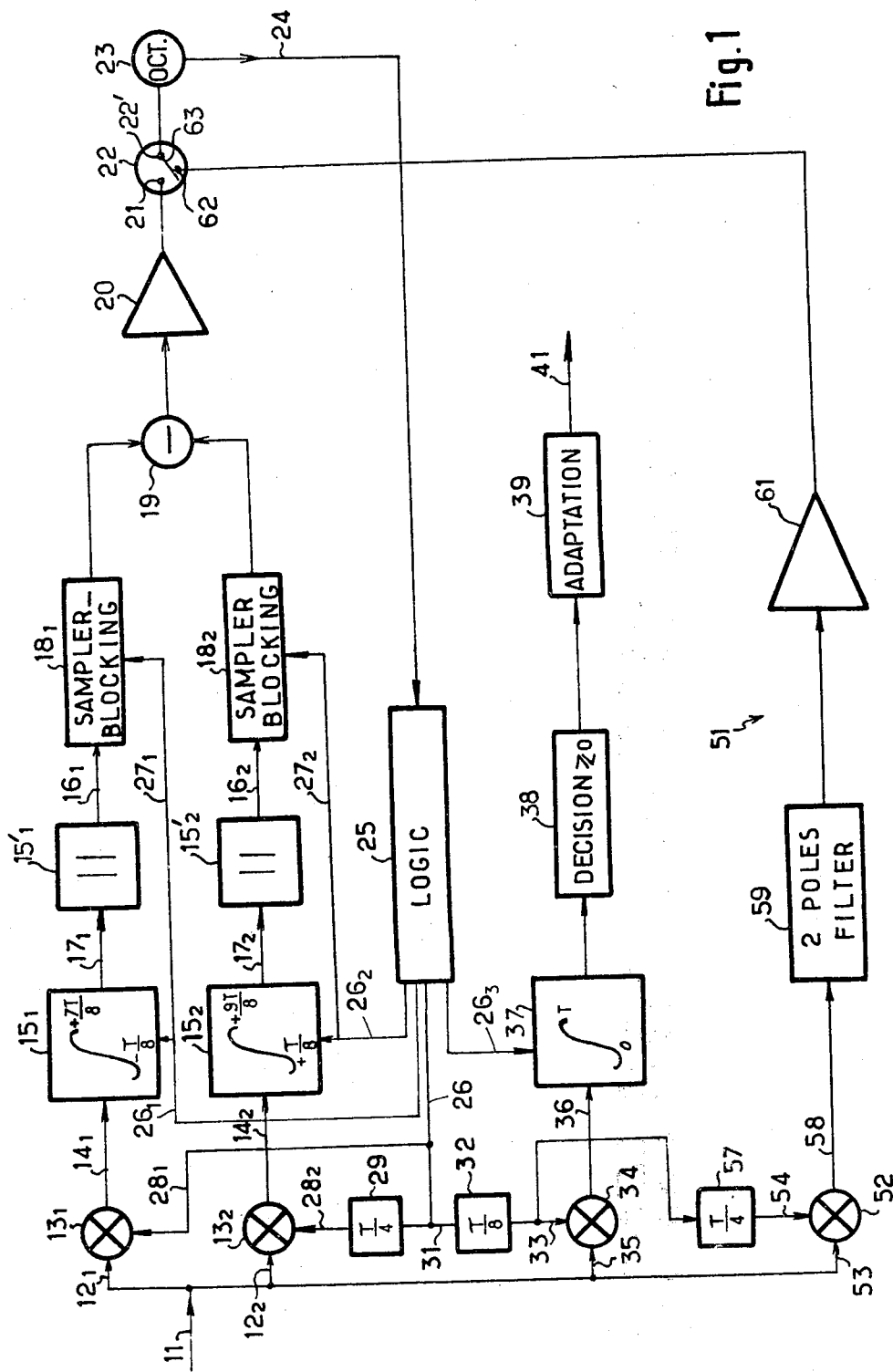
FIG. 1 is a block diagram of the apparatus.

Wire 11 carries an incoming signal which after demodulation separated from its carrier and is divided along a first conductive path $12_1$ and a second conductive path $12_2$ each having a multiplier $13_1$, $13_2$. The outputs $14_1$ and $14_2$ of the multipliers are connected to the lead-ins of integrators $15_1$ and $15_2$ respectively which are followed by non-linear devices, for example devices $16_1$ and $16_2$ providing outputs of absolute voltage values present at the outputs of the integrators $17_1$ and $17_2$.

The absolute values at the outputs of the non-linear devices $16_1$ and $16_2$ are memorized into sampler blocking means $18_1$ and $18_2$ whose outputs are connected to a subtractor 19 which has an output equal to the difference of its input voltages.

The output of the substractor 19 is connected to a loop filter 20 whose output is connected to the input 21 of switching means 22. The output terminal 22' of the switching means 22 is applied to the frequency and phase control input of the voltage controlled local oscillator having its output 24 connected to a logic circuitry 25.

The local oscillator 23 may thereby be frequency and phase modulated about a value close to a multiple of the frequency of the incoming the information signals, for example 64 times this frequency. The logic circuitry 25 provides at its different outputs rectangular pulses having a width equal to that of the period or a multiple of the period of the oscillations provided by the local oscillator 23 and time distributed as will become clear hereinafter.

In an example, the frequency of the incoming signals is 400 Hz and the frequency of the local oscillator 23 is 25.6 kHz.

Figure 2:
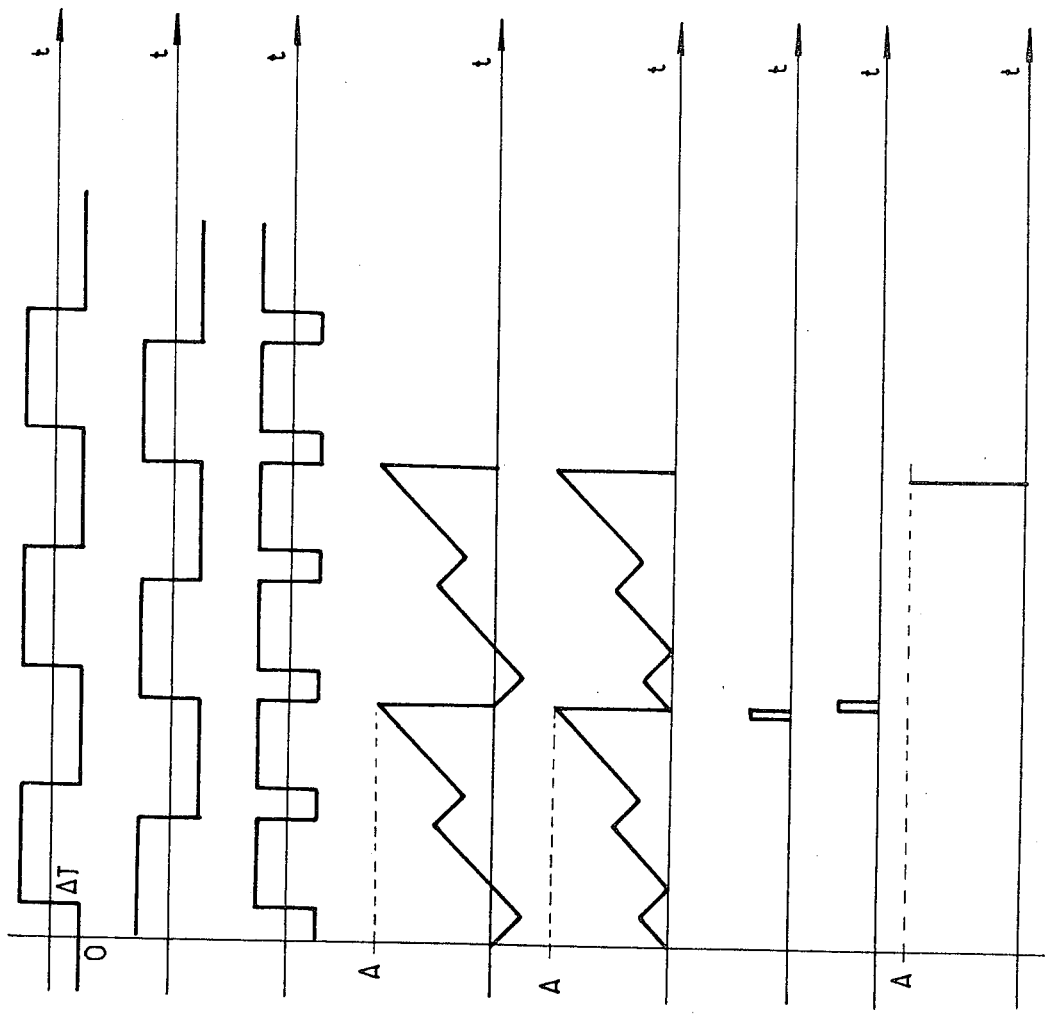
FIG. 2 shows wave-forms at different locations in the apparatus.

The incoming signal, disregarding the noise, which is represented by the wave-form in FIG. 2a is a phase coded signal of the biphase PCM type or the PSK type. It corresponds, for instance, to the digital value +1, as characterized by the transition from a positive voltage to a negative voltage as schematized by the arrow. An output 26 of the logic circuitry 25 carries over the conductive path $28_1$ to the second input of the multiplier $13_1$ a wave-form as shown in FIG. 2b. This waveform comprises a series of pulses having the same pulse width as the representative pulses of the incoming signal. The time shifting corresponds to a phase shift that the apparatus according to the invention is adapted to eliminate.

FIG. 2c represents a signal at the output $14_1$ of the multiplier $13_1$.

FIG. 2d is representative of the result of the integration of signal shown in FIG. 2c: the rising edge corresponds to the integration of a positive voltage value; the falling edge corresponds to the integration of the negative voltage value; etc.

FIG. 2e is representative of the signal at the output $16_1$.

According to the invention, if T is the period of the incoming signal on which the apparatus is to be phase keyed the local oscillator 23, the limits of integration of the integrator $15_1$ are $-T/8$ and $+7T/8$.

The start and end of integration are controlled by a signal applied to the integrator $15_1$ over conductive path $26_1$ from the logic circuitry 25.

The output 26 of the logic circuitry 25 is also connected to the multiplier $13_2$ but via a delay element 29 introducing a retardation of T/4. The signal at the input $28_2$ of the multiplier $13_2$ is represented by a wave-form similar to that of FIG. 2b, but shifted T/4 relative to FIG. 2e. The result of the multiplication with the incoming signal at the input $12_2$ of the multiplier $13_2$ which appears at the output $14_2$ thereof is represented by a wave-form similar to that of FIG. 2c. In accordance with the invention, the limits of integration of the integrator $15_2$ are $+T/8$ and $+9T/8$. The start and end of integration of the integrator $15_2$ are controlled by the output $26_2$ of the logic circuitry 25.

The result of the integration by the integrator $15_2$ may be represented by a wave-form similar to that of FIG. 2d. The signal at the output $16_2$ may be represented by a wave-form similar to that of FIG. 2e.

The pulse shown in FIG. 2f defines the sampling time;

The pulse shown in FIG. 2g defines the instant when the integrator is reset;

and the pulse shown in FIG. 2h is relative to the memorized voltage present at the output of the sampler blocking means $18_1$.

The time during which the absolute voltage value resulting from integration both by the integrator $15_1$ and by the integrator $15_2$ is memorized is controlled by the logic circuitry 25 through conductive paths $27_1$ and $27_2$.

The signal at the output 26 of the logic circuitry 25 is moreover carried over a conductive path 31 to a delay element 32 which introduces a retardation equal to T/8 at the input 33 of a third multiplier 34 whose other input 35 is connected to the conductive path 11. The output 36 of the multiplier 34 is connected to the input of a third integrator 37 whose limits of integration, controlled by signals carried by a conductor $26_3$ outcoming from the logic circuitry 25, are O and T. After acquisition of the digital rhythm, the signal at the input 36 constitutes the time reference.

The integrator 37 is followed by a decision element 38 which compares the signal coming from the integrator 37 with the null voltage reference it comprises. The decision element 38 is followed by an adaptation or shaping element 39 which has at its output 41 an NRZ type signal, i.e. two voltage values which correspond to the values of 1 or 0 of a digital system. The NRZ signals are devoid of noise since they originate in the local oscillator 23 which transcribes in a directly usable manner the message made up by the incoming signals on the wire 11.

Figure 3:
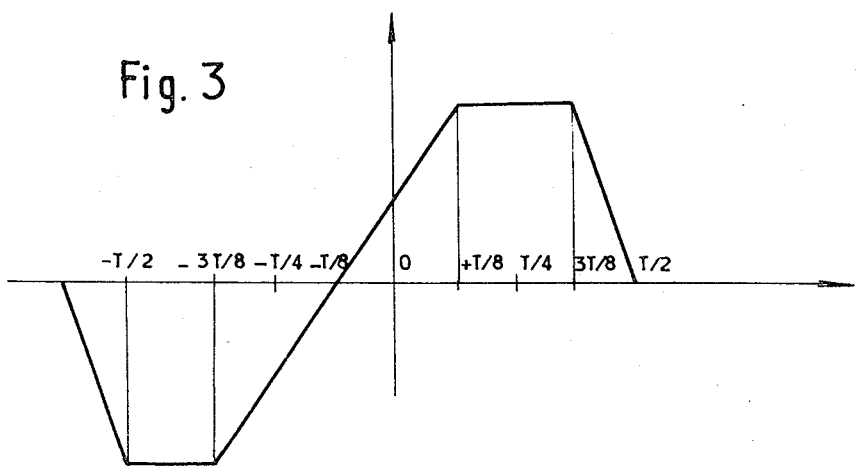
FIG. 3 shows a response curve of the phase comparator.

The graph of FIG. 3 shows the voltage value at the input of the loop filter 20 as a function of the phase shift between the incoming signals on the wire 11 and the signals at the output 26 of the logic circuitry 25, in case the incoming signals are square wave-form representing a series of alternating digital values, 1,0,1 ... or 0,1,0 ...

This graph shows the response of the phase comparator comprised of the two parallel lines having integrators $15_1$ and $15_2$. There is only one abscissa-axis crossing each half period, at an abscissa value of $-T/8$.

Figure 4:
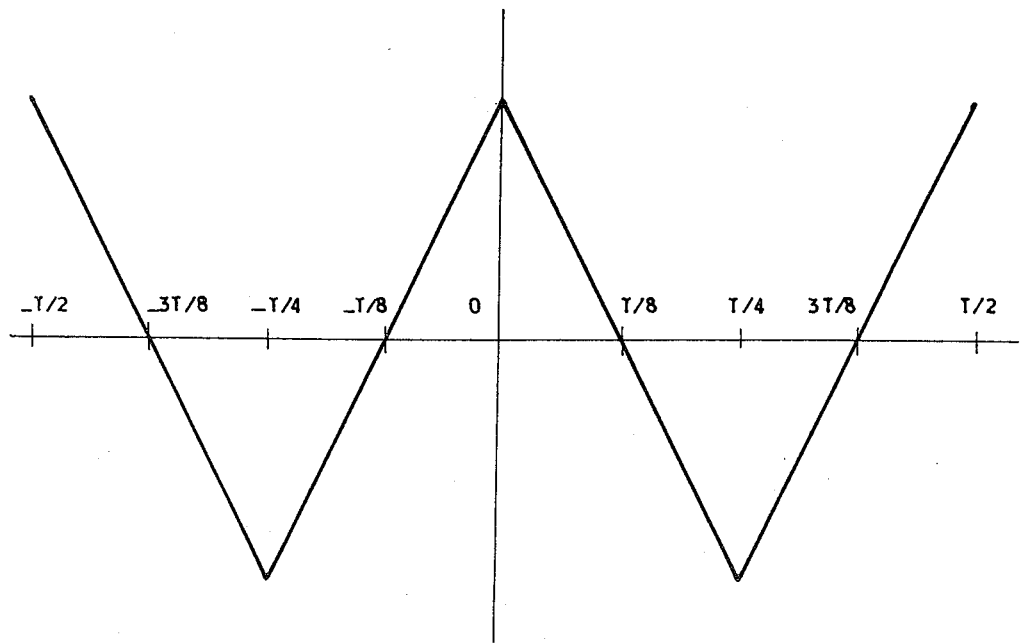
FIG. 4 shows another response curve.

In case the incoming signals represent a series of 0 or 1 digital values, the response of the phase comparator is as represented by the curve of FIG. 4.

The apparatus according to the invention also comprises a rapid acquisition circuit 51 with a multiplier 52 having an input 53 carrying incoming signals and a second input 54 connected to the output 26 of the logic circuitry 25 through a delay element 57 introducing a retardation equal to T/4. The output 58 of the multiplier 52 is connected through a double pole filter 59 of the Butterworth type and through a loop filter 61 to a second input 62 of the switching means 22.

In the rapid acquisition stage, the switching element 63 of the switching means 22 connects the local oscillator 23 to the input 62. After acquisition, the switching element 63 connects the local oscillator 23 to the input 21.

The apparatus has applications in transmission where the intelligence bits have a frequency of 400 Hz and assure acquisition of frequency even for a frequency variation in the order of 30 Hz.

The phase Keying with the signals constituted by a succession of "1'"(ones) is achieved at the utmost after 15 bits, a bit being the duration between the beginning and the end of digital information, with a probability greater than 0.999 for a ratio of E/No of 10 db, E being the bit energy and No the single band spectral density of a white and gaussian noise.

In pursuit operation, i.e. upon reception of intelligence bits, the probability of bit error does not deviate more than 0.5 db from the theoretical curve given by the relationship:

$$P_E = \frac{1}{2}(1 - Erf \sqrt{\frac{E}{No}})$$

In a modified embodiment, the delay element 32 is eliminated. The delay element 57 then introduces a retardation equal to 3T/8.

What we claim is:

1. Apparatus for phase keying in frequency and phase voltage controlled oscillator with an incoming signal having a T period, and phase coded, of the biphase PCM type or PSK type comprising a circuit loop for phase controlling said oscillator with logic circuitry and first and second conductive paths having first and second integrators respectively, the integration time of each of said first and second integrators being equal to the period T of the incoming signal, the limits of integration time of said first integrator being $-T/8$ and $+7T/8$ and that of said second integrator being $+T/8$ and $+9T/8$, and a delay element interposed between the logic circuitry and said second conductive path for introducing retardation time of T/4.

2. Apparatus according to claim 1, further comprising a third conductive path for bit detection having a third integrator, and another delay element interposed between the logic circuitry and said third conductive path, said other delay element introducing retardation time of T/8.

3. Apparatus according to claim 2, further comprising a fourth conductive path for rapid acquisition, switching means being arranged at the input of the oscillator to put the oscillator in the phase controlling circuit loop with two parallel conductive paths thereby eliminating phase ambiguity.

4. Apparatus according to claim 3, further comprising a third delay element introducing retardation time of T/4 interposed between said logic circuitry and said fourth conductive path.

5. Apparatus according to claim 1, further comprising a third conductive path for bit detection having a third integrator, said third conductive path being connected directly to said logic circuitry without introducing time retardation, a fourth conductive path for rapid acquisition, and a delay element interposed between said logic circuitry and said fourth conductive path introducing retardation time of 3T/8.

* * * * *